United States Patent
Valente

(10) Patent No.: US 8,520,741 B2
(45) Date of Patent: Aug. 27, 2013

(54) MULTIPLE PASS VIDEO DECODING METHOD AND DEVICE

(75) Inventor: Stephane Valente, Paris (FR)

(73) Assignee: Entropic Communications, Inc., San Diego, CA (US)

( * ) Notice: Subject to any disclaimer, the term of this patent is extended or adjusted under 35 U.S.C. 154(b) by 1518 days.

(21) Appl. No.: 11/916,192

(22) PCT Filed: May 30, 2006

(86) PCT No.: PCT/IB2006/051706
§ 371 (c)(1),
(2), (4) Date: Nov. 30, 2007

(87) PCT Pub. No.: WO2006/129266
PCT Pub. Date: Dec. 7, 2006

(65) Prior Publication Data
US 2010/0135414 A1    Jun. 3, 2010

(30) Foreign Application Priority Data

Jun. 1, 2005 (EP) .................................... 05300440

(51) Int. Cl.
*H04N 7/12* (2006.01)

(52) U.S. Cl.
USPC ............ 375/240.26; 375/240.24; 375/240.16; 375/240.12; 375/250

(58) Field of Classification Search
USPC ............. 375/240.24, 240.26, 240.12, 240.16, 375/250
See application file for complete search history.

(56) References Cited

U.S. PATENT DOCUMENTS

| | | | | |
|---|---|---|---|---|
| 5,343,248 A | * | 8/1994 | Fujinami | 348/452 |
| 5,455,629 A | * | 10/1995 | Sun et al. | 375/240.27 |
| 5,457,499 A | * | 10/1995 | Lim | 348/474 |
| 5,614,960 A | * | 3/1997 | Chiba et al. | 348/700 |
| 5,818,533 A | * | 10/1998 | Auld et al. | 375/240.14 |
| 5,899,579 A | * | 5/1999 | Park | 386/253 |

(Continued)

FOREIGN PATENT DOCUMENTS

| | | |
|---|---|---|
| JP | 7184214 A | 7/1995 |
| JP | 8280022 A | 10/1996 |

(Continued)

OTHER PUBLICATIONS

Dunlop, J; et al "Semiconductor IP Core for Ultra Low Power MPEG-4 Video Decode in System-on-Silicon" 2003 IEEE International Conference on Acoustics, Speech, and Signal Processing, vol. 1 of 6, Apr. 6, 2003, pp. 681-684.

(Continued)

*Primary Examiner* — Ricky Ngo
*Assistant Examiner* — Dewanda Samuel
(74) *Attorney, Agent, or Firm* — Bruce Greenhaus; Richard Bachland; Duane Morris LLP

(57) ABSTRACT

The present invention relates to a video decoder (DEC) for decoding a bit stream (BS) corresponding to pictures (P) of a video signal, coded pictures being likely to include macroblocks coded in a progressive and in an interlaced way, said decoder including a decoding unit (DEU) for decoding macroblocks coded in a progressive way. A video decoder according to the invention includes a decoding configuration unit (DCU) for activating said decoding unit several times for decoding a single picture and for configuring the read and/or write stride at each pass of said picture in said decoding unit.

4 Claims, 3 Drawing Sheets

(56) References Cited

U.S. PATENT DOCUMENTS

| | | | |
|---|---|---|---|
| 5,990,958 A * | 11/1999 | Bheda et al. ............... | 348/407.1 |
| 6,141,456 A * | 10/2000 | Pearlstein et al. ............ | 382/250 |
| 6,504,872 B1 | 1/2003 | Fimoff et al. | |
| 7,058,290 B1 * | 6/2006 | Kim et al. .................... | 386/356 |
| 7,646,810 B2 * | 1/2010 | Tourapis et al. ......... | 375/240.12 |
| 8,254,455 B2 * | 8/2012 | Wu et al. .................. | 375/240.16 |
| 8,320,469 B2 * | 11/2012 | Kato ........................ | 375/240.26 |
| 2001/0016010 A1 | 8/2001 | Kim | |
| 2004/0264580 A1 * | 12/2004 | Chiang Wei Yin et al. ........................ | 375/240.25 |
| 2005/0002646 A1 | 1/2005 | Sato | |
| 2005/0013374 A1 | 1/2005 | Kim | |
| 2005/0024363 A1 | 2/2005 | Estrop | |
| 2005/0262276 A1 * | 11/2005 | Singh et al. ..................... | 710/22 |

FOREIGN PATENT DOCUMENTS

| | | |
|---|---|---|
| JP | 8294115 A | 11/1996 |
| JP | 9172601 A | 6/1997 |
| JP | 2000032472 A | 1/2000 |
| WO | 02096113 A1 | 11/2002 |

OTHER PUBLICATIONS

Song, J; et al "Fast Extraction of Spatially Reduced Image Sequences From MPEG-2 Compressed Video" IEEE Transactions on Circuits and Systems for Video Technology, IEEE Service Center, vol. 9, No. 7, Oct. 1999, pp. 1100-1114.

Mladen, Berekovic; et al "Multicore System-on-Chip Architecture for MPEG-4 Streaming Video" IEEE Transactions on Circuits and Systems for Video Technology, IEEE Service Center, vol. 12, No. 8, Aug. 2002, Entire Document.

Stolberg, H-J; et al "The M-Pire MEPG-4 Codec DSP and its Macroblock Engine" Multimedia and Expo, 2001. ICME 2001. IEEE International Conference on Aug. 22-25, 2001, pp. 230-233.

International Standard, ISO/IEC 14496-2, Information Technology—Coding of audio-visual objects—Part 2: Visual, pp. 138-140, 1999.

Shizhong Liu, "Local Bandwidth Constrained Fast Inverse Motion Compensation for DCT-Domain Video Transcoding," IEEE Transactions on Circuits and System for Video Technology, May 12, 2002.

* cited by examiner

MULTIPLE PASS VIDEO DECODING METHOD AND DEVICE

RELATED APPLICATIONS

This application claims the priority benefits of PCT International Application PCT/IB2006/051706, filed May 30, 2006, which claims priority to European patent application No. 05300440.4, filed Jun. 1, 2005.

FIELD OF THE INVENTION

The present invention relates to a video decoder for decoding a bit stream corresponding to pictures of a video signal, the coded pictures being likely to include macroblocks coded in a progressive and in an interlaced way. More particularly, the invention relates to a decoder including a decoding unit for decoding macroblocks coded in a progressive way.

BACKGROUND OF THE INVENTION

As indicated in "Information Technology—Coding of audio-visual objects—Part 2: Visual, Amendment 1: Visual extensions", ISO/IEC 14496-2:1999/Amd. 1:2000, ISO/IEC JTV 1/SC 29/WG 11 N 3056, the MPEG-4 standard defines a syntax for video bit streams which allows interoperability between various encoders and decoders. Standards describe many video tools, but implementing all of them can result in a too high complexity for most applications. To offer more flexibility in the choice of available tools and encoder/decoder complexity, the standard further defines profiles, which are subsets of the syntax limited to particular tools.

For instance, the Simple Profile (SP) is a subset of the entire bit stream syntax which includes in MPEG terminology: I and P VOPs, AC/DC prediction, 1 or 4 motion vectors per macroblock, unrestricted motion vectors and half pixel motion compensation for progressive pictures. The Advanced Simple Profile (ASP) is a superset of the SP syntax: it includes the SP coding tools, and adds B VOPs, global motion compensation, interlaced pictures, quarter pixel motion compensation where interpolation filters are different from the ones used in half-pixel motion compensation, and other tools dedicated to the processing of interlaced pictures.

The document US 2001/0016010 discloses an apparatus for receiving digital motion pictures for down conversion of interlaced scanning sequence in digital television. Said apparatus is designed for decoding field-based and frame-based coded blocks. Indeed, this document discloses a decoder that is provided with functions enabling the direct decoding of field-coded macroblocks as defined in ASP.

Nevertheless, interlacing modifies two low-level processes in the MPEG-4 standard: motion compensation and inverse Direct Cosine Transform (DCT in the following). In some devices with limited CPU resources or power resources, it can be advantageous to use hardware accelerated functions to carry on some of the decoding operations, even if the hardware acceleration devices are not capable to perform the decoding operations in a conformant way. This results in decoding errors which are particularly penalizing in the case of interlaced macroblocks in interlaced pictures.

SUMMARY OF THE INVENTION

Accordingly, it is an object of the invention to provide a video decoder, notably of the SP type, that uses a decoding unit for decoding progressive pictures and progressive macroblocks and that minimizes penalizing errors concerning the decoding of interlaced pictures.

To this end, there is provided a video decoder including a decoding configuration unit for activating said decoding unit several times for decoding a single picture and for configuring the read and/or write stride at each pass of said picture in said decoding unit.

It is thus provided a pseudo-ASP decoder that relies on a decoding unit able to process progressive pictures and, in the case of MPEG-4, on MPEG-4 SP acceleration functions.

Advantageously, decoded pictures are stored in a memory.

In an embodiment, said decoding configuration unit includes a missing macroblock detection module for detecting missing macroblock in decoded pictures and using such detection for the configuration of said decoding unit.

In an implementation, the stride configuration is changed at each pass by doubling said stride.

In an embodiment, a full picture is decoded at each pass.

Advantageously, macroblocks decoded during a former pass are left unchanged in the following pass.

In an implementation, macroblocks that cannot be decoded or that have not yet been decoded are filled with dummy blocks.

In an embodiment, said decoding configuration unit is activated on a picture basis when a flag, decoded or inferred from the bitstream, is set to a value indicating that said picture is interlaced.

The invention also relates to a method for decoding a bit stream in pictures of a video signal, coded pictures being likely to include macroblocks coded in a progressive and in an interlaced way, said method including a decoding step for decoding macroblocks coded in a progressive way. Said method is characterized in that it includes a decoding configuration step that activates said decoding step several times for decoding a single picture and that configure the read and/or write stride at each pass of said picture by said decoding step.

In an embodiment, decoded pictures are stored in a memory.

In an embodiment, said decoding configuration step includes a missing macroblock detection for detecting missing macroblock in decoded pictures and using such detection for the configuration of said decoding step.

In an embodiment, the stride configuration is changed at each pass by doubling said stride.

In an embodiment, a full picture is decoded at each pass.

In an embodiment, macroblocks decoded during a former pass are left unchanged in the following pass.

In an embodiment, macroblocks that cannot be decoded or that have not yet been decoded are filled with dummy blocks.

In an embodiment, said decoding configuration step is activated on a picture basis when a flag, decoded or inferred from the bitstream, is set to a value indicating that said picture is interlaced.

The invention also relates to a computer program product comprising program instructions for implementing, when said program is executed by a processor, a decoding method as disclosed above.

The invention also relates to a mobile device including a video decoder according to the invention.

The invention finds application in the playback of video standards as MPEG-4 and DivX streams on mobile phones in which a video decoder as described above is advantageously implemented.

BRIEF DESCRIPTION OF THE DRAWINGS

Additional objects, features and advantages of the invention will become apparent upon reading the following detailed description and upon reference to the accompanying drawings in which.

DETAILED DESCRIPTION OF THE INVENTION

In the following description, well-known functions or constructions by the person skilled in the art are not described in detail since they would obscure the invention in unnecessary detail.

Figure 1:
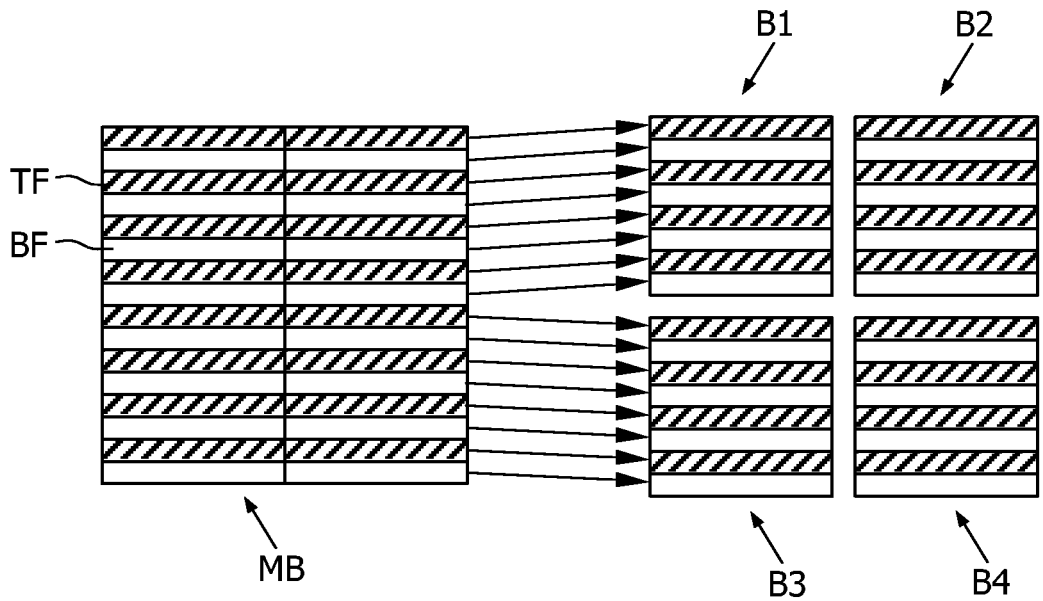
FIG. 1 illustrates a macroblock structure in frame DCT coding.

When interlaced pictures are used in a coding, the inverse DCT can be either a frame DCT or a field DCT as specified by a syntax element called dct_type included in the bit stream for each macroblock with texture information. When the dct_type flag is set to 0 for a particular macroblock, the macroblock is frame coded and the DCT coefficients of luminance data encode 8*8 blocks that are composed of lines from two fields alternatively. This mode is illustrated in FIG. 1. Two fields TF and BF are respectively represented by hatched part and blank part. FIG. 1 illustrates the frame structure of the 8*8 blocks B1', B2', B3', B4' of an interlaced macroblock MB after frame DCT coding.

Figure 2:
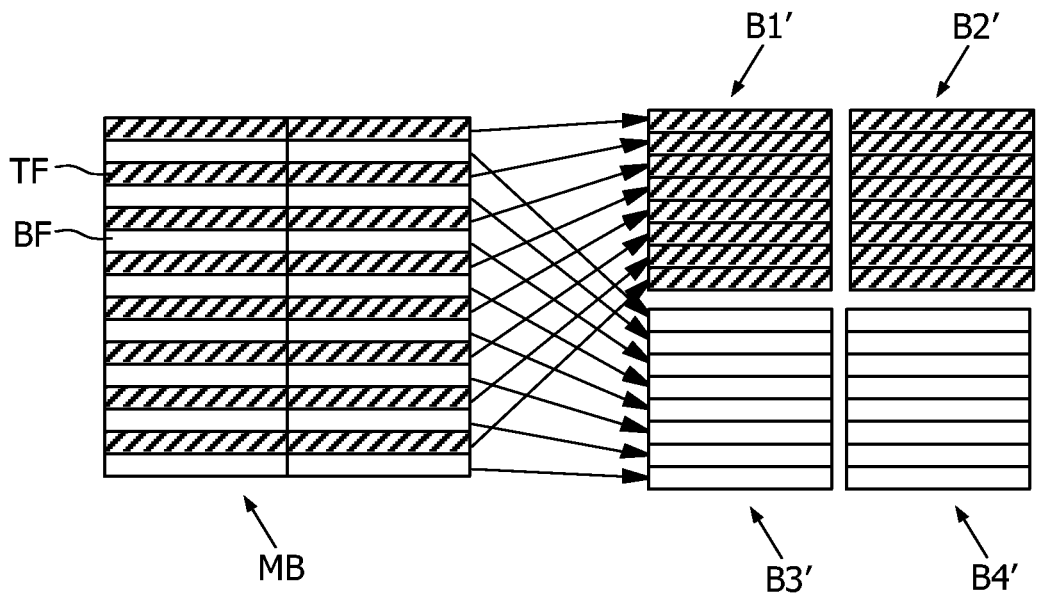
FIG. 2 illustrates a macroblock structure in field DCT coding.

When the dct_type flag is set to 1 for a particular macroblock, the macroblock is field coded and the DCT coefficients of luminance data are formed such that a 8*8 block consists of data from one field only. This mode is illustrated in FIG. 2. FIG. 2 illustrates the frame structure of the 8*8 blocks B1', B2', B3', B4' of an interlaced macroblock MB after field DCT coding. In classical inverse DCT, the luminance blocks B1', B2', B3' and B4' have then to be inverse permuted back to frame macroblocks. It is here reminded that, generally, even if field DCT is selected for a particular macroblock, the chrominance texture is still coded by frame DCT.

The motion compensation can also either be frame-based or field-based for each macroblock. This feature is specified by a syntax element called field prediction at the macroblock level in P and S-VOPs (or Sprite-VOPs), for non global motion compensation (GMC) macroblocks. Effectively, it has to be noted that global motion compensation is always frame-based in interlaced pictures.

If the field prediction flag is set to 0, non-GMC motion compensation is performed just like in the non-interlaced case. This can be done either with a single motion vector applied to 16*16 blocks in mode 1-MV, or with 4 motion vectors applied to 8*8 blocks in mode 4-MV. Chrominance motion vectors are always inferred from the luminance ones. If the field_prediction flag is set to 1, non-GMC blocks are predicted with two motion vectors, one for each field, applied to 16*8 blocks of each field. Like in the field DCT case, the predicted blocks have to be permuted back to frame macroblocks after motion compensation.

Moreover, field based predictions may result in 8*4 predictions for chrominance blocks, by displacement of one chroma line out of two, which corresponds to one field only in the 4:2:0 interlaced color format.

During encoding, in non-GMC macroblocks, frame and field DCT and frame and field motion prediction can be applied independently from each other. Table 1 summarizes the different combinations that may arise in I-, P- and S-VOPs of ASP streams excluding GMC macroblocks.

TABLE 1

| Type number | Name | DCT Type | Motion prediction type |
|---|---|---|---|
| 1 | Intra frame | Frame | None |
| 2 | Intra field | Field | |
| 3 | Inter 1 MV MC/frame DCT | Frame | 16 × 16 frame-based for luminance |
| 4 | Inter 1 MV MC/field DCT | Field | 8 × 8 frame-based for chrominance |
| 5 | Inter 4 MV MC/frame DCT | Frame | 4 8 × 8 frame-based for luminance |
| 6 | Inter 4 MV MC/field DCT | Field | 8 × 8 frame-based for chrominance |
| 7 | Inter field MC/frame DCT | Frame | 2 16 × 8 field-based for luminance |
| 8 | Inter field MC/field DCT | Field | 2 8 × 4 field-based for chrominance |

Figure 3:
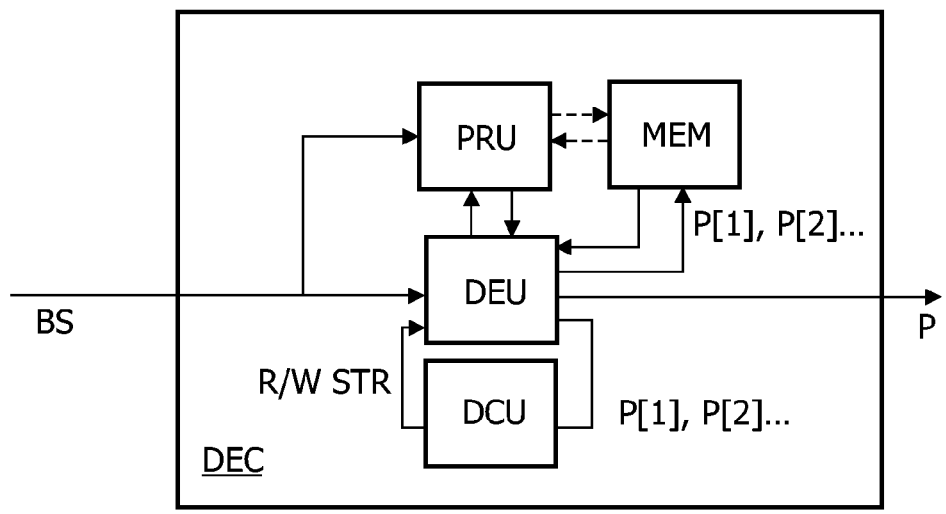
FIG. 3 represents a video decoder according to the invention.

FIG. 3 schematically represents a video decoder DEC for decoding a bit stream BS in pictures P of a video signal. The bit stream is likely to include macroblocks coded in a progressive way and in an interlaced way. The decoder DEC includes a decoding unit DEU for decoding macroblocks coded in a progressive way. It is the case for MPEG-4 Simple Profile decoding functions that can only reconstruct frame-based 8*8 inverse DCT and motion compensate 16*16 or 8*8 frame-based blocks for the luminance channel and 8*8 blocks for the chrominance ones.

Figure 4:
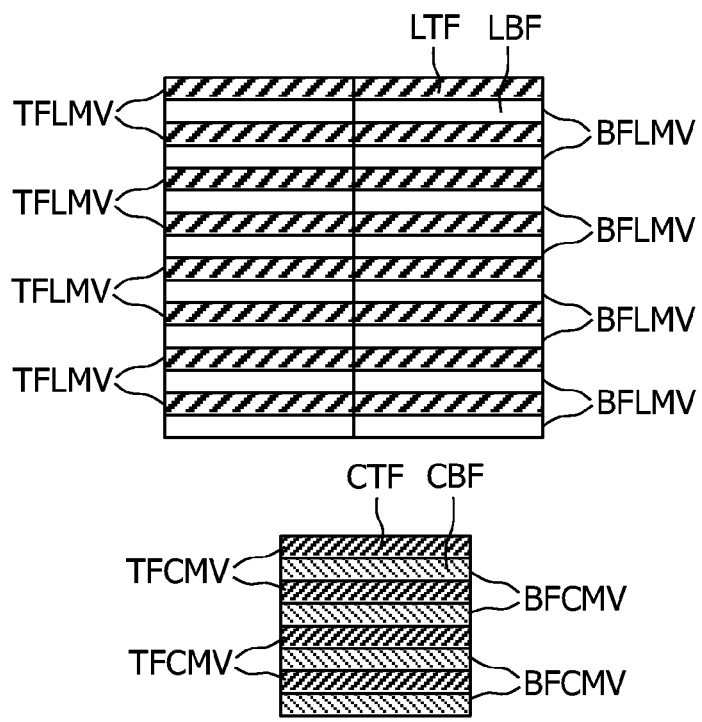
FIG. 4, where the upper part relates to the luminance and the lower part to the chrominance, illustrates a field-based motion compensation for a field-predicted macroblock presenting a motion compensation vector associated with each field.

The motion compensation of macroblocks of types 7 and 8 (see Table 1) is especially a problem for the decoding unit DEU as implemented in a video decoder according to the invention, because it is field-based, requiring to displace two 16×8 field pixels LTF and LBF for the luminance channel, and two 8×4 field pixels CTF and CCF for each chrominance channel as illustrated in FIG. 4. Likewise, macroblocks of types 2, 4 and 6 are not directly supported, because field-based inverse DCT operations are required.

A video decoder according to the invention includes a decoding configuration unit DCU that is able to play on read and write strides R/W STR of the decoding unit DEU. The configuration unit DCU according to the invention makes possible to read or write pixels structured in individual fields.

By simply doubling the stride of read operations for the luminance pixels, it is possible to make the decoding unit read every other line, corresponding to one field only from the reference texture, while reconstructing (writing) data in a frame-based representation. Using its 8×8 motion compensation capability, it would then become possible to directly reconstruct 8×8 blocks of frame data as illustrated on the right side of FIG. 1 as well as 8×8 blocks of field data as illustrated on right side of FIG. 2. Thus varying configuration of the decoding unit DEU enables to cover the motion prediction needs for luminance and chrominance of types 3, 4, 5, 6, and for luminance only in Types 7 and 8.

By changing the write stride, one can reconstruct a picture by writing data either every line in a frame-based manner, or every other line in a field-based manner. It enables the decoding unit DEU to re-interlace fields.

Such a change in the configuration of the decoding unit can only be done at the beginning of rectangular group of macroblocks. It is not possible to change the stride value R/W STR for read and/or write operations for each macroblock.

Thus the decoding configuration unit DCU activates the decoding unit several times for a single picture in order to decode the picture in multiple passes, while changing the stride configuration at each pass. It enables to specifically decode one or several macroblock types that could not be decoded with stride configurations used in the preceding pass.

At each pass, a full picture P[1] or P[2] is decoded, in a single memory MEM area, to follow the regular data flow expected by the hardware. The macroblocks that were decoded during a former pass are left unchanged, and the macroblocks that cannot be decoded and have not been decoded yet, are filled with dummy blocks.

All Types in Table 1 are related to some read/write stride combinations, and all macroblocks can be reorganized so that the ones sharing the same combination are reconstructed during the same pass. Dedicated processing unit PRU are used to support some processing, for example, for processing macroblocks of type 7 and 8 having distinct motion compensation vectors for each field. Such dedicated processing units are used or not depending on what types of macroblocks are to be decoded.

Figure 5:
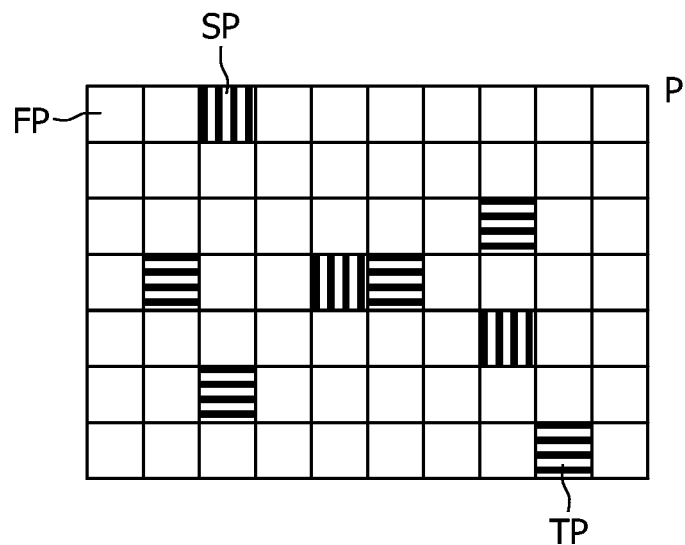
FIG. 5 illustrates the reconstruction of a field-predicted macroblock along multiple pass according to the invention, FIG. 6 gives an example of an advantageous implementation of the invention.

As illustrated in FIG. 5, the first pass FP decodes the full picture size, but leaves dummy blocks, represented by hatched blocks, for the ones that cannot be decoded with the current read/write stride. The second SP and third TP passes take care of other macroblocks with different strides, but keeping the previously reconstructed macroblocks unaltered in the main picture P. Thus, each pass decodes a full picture P in the same memory area. At each pass, the stride is modified to be able to decode a new type of macroblocks while passing the right information to the decoding unit DEU to leave previously decoded macroblocks unchanged in the picture memory area. For instance, it is done by passing the motion vectors that will simply recopy the previously decoded data without altering it.

In an advantageous embodiment, the picture P is progressively reconstructed in a single memory area, without requiring to reorder the macroblocks from various memory locations at the end of the process, because the already decoded macroblocks are left at their respective location within the decoded picture, and the current macroblocks are decoded at their final location within the picture P. When reconstructing field-coded information, a separate pass is used for each field and the pixels of each macroblock decoded by the decoding unit DEU fills in a single field across a pair of macroblocks arranged vertically.

An example of a two-pass decoding is given in the following:

The first pass focuses on frame-based prediction and frame DCT. The read and write strides are therefore set for a frame-based representation. It reconstructs a full picture using Simple Profile decoding unit accelerations with:

Type 1: Intra frame macroblocks.

Type 3 and 5: frame-predicted macroblocks with frame texture.

Type 4 and 6: only the frame-based motion compensation part of the macroblock, no field texture is added, even if it is present in the bitstream.

Type 7: field-predicted with frame texture macroblocks are reconstructed in a dedicated processing unit PRU using the decoding of two instances where two macroblocks are decoded instead of one, the first one in the 1-MV mode with the top field motion vector, the second one with the bottom motion vector. Upon completion, the first macroblock holds the correct top field pixels with an irrelevant bottom field, the second macroblock holds the correct bottom field pixels, with an irrelevant top field. The second pass will reassemble the multiple instances to form the correct Type 7 macroblock, later.

Type 8: only the field-based motion compensation is carried out, also using two macroblock instances. The second pass will also reassemble them later.

Other Types: a low-cost operation is used to fill in the empty spaces of the macroblocks that cannot be decoded yet.

At this point, all motion prediction has been performed including field-based motion prediction in several macroblock instances.

The second pass uses field-based read/write strides and may use two sub-passes, one for the top field, and one for the bottom field. The reference picture is set to the picture reconstructed in the first pass, so that the decoding unit can recopy the blocks that were already decoded without altering them. The anchor picture is no longer referenced, since all motion prediction has already been performed.

Type 1, 3 and 5: the previously macroblocks are simply recopied by the decoding unit using the 4-MV mode with the adequate motion vectors and no DCT texture added.

Type 2: field INTRA macroblocks are reconstructed by the decoding unit DEU.

Type 4 and 6: field DCT texture is added to the prediction formed during the first pass.

Type 7: the macroblocks are re-interlaced from their respective instances, using field-based motion compensation.

Type 8: the macroblocks are re-assembled like Type 7 macroblocks, and field-based DCT is added to the motion prediction.

At the end of this second pass, the final correct interlaced picture has been obtained.

Figure 6:
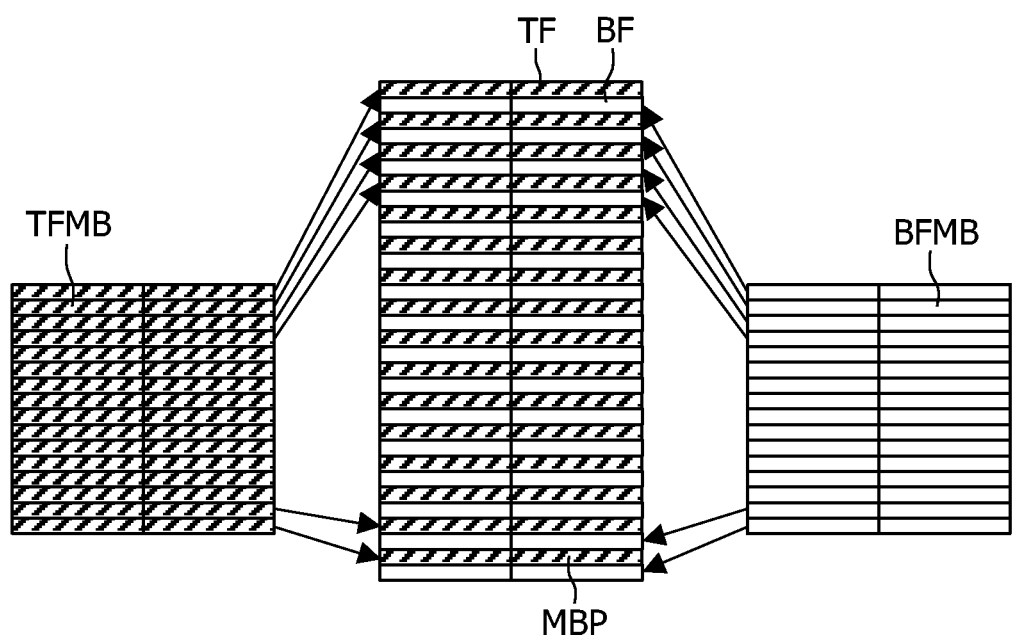

In the case the decoding unit is designed in a way to process a macroblock at a time, that is to say four 8×8 blocks for every macroblock, by doubling the write stride to write macroblocks in a field-based mode, it is likely that the hardware fills an area of size 16×32. As illustrated in FIG. 6, it corresponds to four 8×8 blocks TFMB and BTMB written as fields in a frame structure that occupies 16×32 pixels across an interlaced macroblock pair MBP. It is therefore necessary to split the reconstruction of interlaced information in two sub-passes, one for each field TF and BF, recombining data so that each macroblock TFMB and BFMB decoded by the decoding unit actually fills the top or bottom field TF and BF in two macroblocks MBP arranged vertically. The second step of the former description may actually be composed of two sub-steps, each of them carrying operations that decode a single field for the whole picture. During re-interlacing, each macroblock decoded by the decoding unit, when written with field-based strides, fills a single field across a macroblock pair.

The invention is particularly interesting for the processing of video signals on mobile devices like mobile phones. MPEG-4 or DivX streams can thus be processed by reusing an SP decoding unit to decode ASP streams.

It is to be understood that the present invention is not limited to the aforementioned embodiments and variations and modifications may be made without departing from the spirit and scope of the invention as defined in the appended claims. In the respect, the following closing remarks are made.

There are numerous ways of implementing functions of the method according to the invention by means of items of hardware or software, or both, provided that a single item of hardware or software can carry out several functions. It does not exclude that an assembly of items of hardware or software or both carry out a function, thus forming a single function without modifying the method of processing in accordance with the invention.

Said hardware or software items can be implemented in several manners, such as by means of wired electronic circuits or by means of an integrated circuit that is suitable programmed respectively.

Any reference sign in the following claims should not be construed as limiting the claim. It will be obvious that the use of the verb "to include" or "to comprise" and its conjugations do not exclude the presence of any other steps or elements besides those defined in any claim. The article "a" or "an" preceding an element or step does not exclude the presence of a plurality of such elements or steps.

The invention claimed is:

1. A video decoder for decoding a bit stream corresponding to pictures of a video signal, the coded pictures including macroblocks coded in a progressive and in an interlaced way, said decoder comprising a decoding unit for decoding macroblocks coded in a progressive way, characterized in that said video decoder includes a decoding configuration unit for activating said decoding unit several times for decoding a single picture and for configuring a read and/or write stride at each pass of said picture in said decoding unit, wherein said decoding configuration unit is activated on a picture basis when a flag, decoded or inferred from the bit stream is set to a value indicating that said picture is interlaced.

2. A method for using a video decoder to decode a bit stream corresponding to pictures of a video signal, the pictures comprising macroblocks coded in a progressive and in an interlaced way, said method comprising a decoding configuration step that uses the video decoder to decode a single picture in multiple passes and configures the read and/or write stride at each pass, wherein said decoding configuration step is activated on a picture basis when a flag, decoded or inferred from the bit stream, is set to a value indicating that said picture is interlaced.

3. A non-transitory computer readable storage medium comprising program instructions for implementing, when executed by a processor, causes the processor to decode a bit stream corresponding to pictures of a video signal, the pictures comprising macroblocks coded in a progressive and in an interlaced way, the method comprising:
   a decoding configuration that uses the video decoder to decode a single picture in multiple passes;
   configuring a read and/or write stride at each of the multiple passes; and
   wherein said decoding configuration step is activated on a picture basis when a flag, decoded or inferred from the bit stream, is set to a value indicating that said picture is interlaced.

4. An apparatus comprising:
   a video decoder configured to decode a bit stream corresponding to coded pictures of a video signal, the coded pictures including macroblocks coded in a progressive and in an interlaced way, said decoder comprising a decoding unit for decoding macroblocks coded in a progressive way, characterized in that said video decoder includes a decoding configuration unit for activating said decoding unit several times for decoding a single picture and for configuring a read and/or write stride at each pass of said picture in said decoding unit, wherein said decoding configuration unit is activated on a picture basis when a flag, decoded or inferred from the bit stream, is set to a value indicating that said picture is interlaced.

* * * * *